United States Patent Office 3,282,131
Patented Nov. 1, 1966

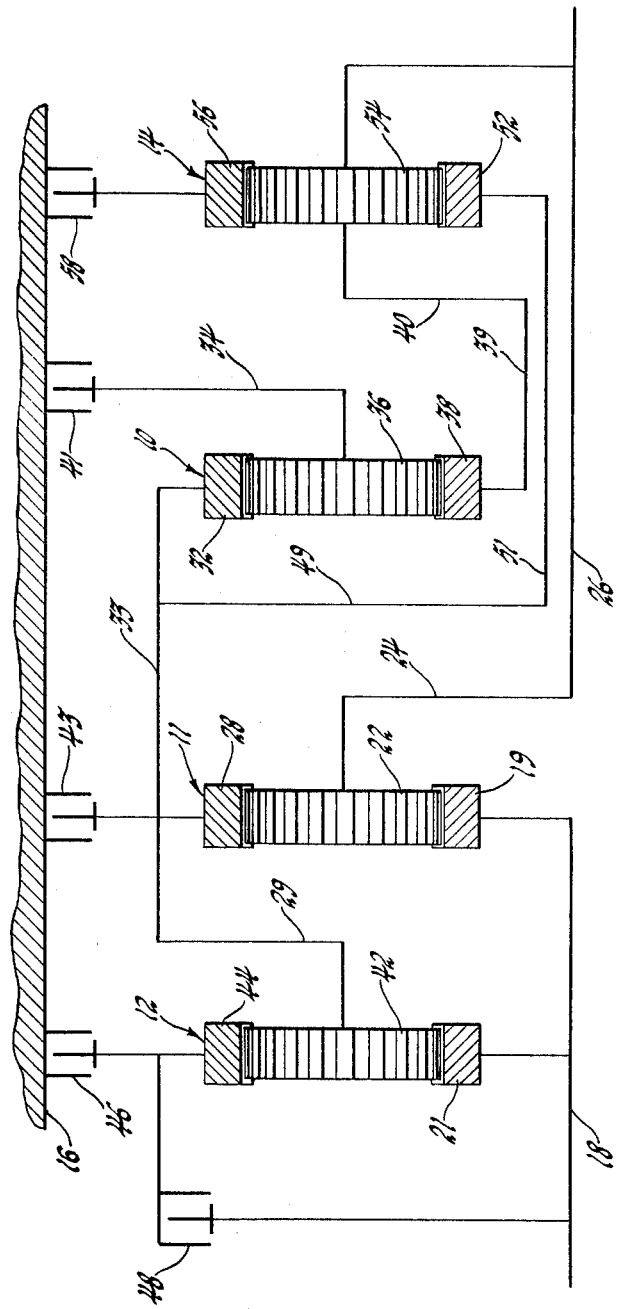

3,282,131
TRANSMISSION
Marion D. Smith, Indianapolis, Ind., assignor to General Motors Corporation, Detroit, Mich., a corporation of Delaware
Filed Aug. 9, 1963, Ser. No. 301,008
10 Claims. (Cl. 74—758)

This invention relates to variable speed transmissions and particularly to variable speed transmissions utilizing planetary gear drive arrangements.

Constant efforts are being made to design improved variable speed transmissions, such as transmissions having range gearing including planetary gear drives, that will provide a wide selection of predetermined drive ratios and correspondingly a wide selection of predetermined torque ratios and a predetermined geometric step pattern between the successive drive ratios. The advantages of providing a wide selection of predetermined torque ratios and a predetermined geometric step pattern between successive drive ratios are well known. Among these is the advantage of extending the range of usefulness of prime movers, such as internal combustion engines, and the advantage of matching an available prime mover to a given load to utilize maximum prime mover efficiency which is in part dependent on the geometric step pattern between successive ratios. For instance, in applications where the loads to be driven and the torque requirements to drive these loads are variable and extend over only limited speed ranges of the entire speed range such as in applications where both relatively large loads are to be driven only in the lower speed ranges and smaller loads in the higher speed ranges, it is desirable that the step between two successive and often used drive ratios be small. Since the larger the step, the larger is the drag on the prime mover occurring during shifting which impairs prime mover efficiency. When the majority of the time of operation is spent in driving relatively large loads in the lower drive ratios, it is desirable that the step between these lower drive ratios be relatively small. This type of step pattern is advantageous in applications having wide variations in load such as a bus where under large load conditions the vehicle is started in the lowest drive ratio and under smaller load conditions is started in a higher drive ratio. It is also well known that the fewer components that go to make up the range gearing and the simpler the arrangement, the less expensive, the lighter, and the more efficient the transmission will be. While present day transmissions do provide a selection of drive ratios, these transmissions generally have complex gear arrangements whose large number of parts and their subjectivity to wear as well as the complexity of the gearing arrangement restrict their usefulness both from the standpoint of cost and reliability and the matching of a particular prime mover to a given load.

With the foregoing in mind, this invention as illustrated in one embodiment employs torque converter driven range gearing comprising four planetary gear sets arranged in a simplified manner to provide four forward and one reverse drive ratios having the smallest step between the first and second forward drive ratios. In the first forward drive ratio the carrier of a first planetary gear set is retarded which has pinions meshing with a sun gear connected to drive an output shaft and a ring gear driven by the ring gear of a second planetary gear set. The second gear set includes a carrier connected to drive the output shaft which has pinions meshing with the ring gear of the second gear set and a sun gear driven by an input shaft and with the carrier of the first gear set retarded, there is provided the lowest forward drive ratio between the input and output shafts. In the second forward drive ratio the ring gear of the second gear set is retarded and output is from the carrier of the second gear set to the output shaft to provide a higher drive ratio. In the third forward drive ratio the ring gear of a third gear set is retarded. The carrier of the third gear set has pinions meshing with the ring gear of the third gear set and a sun gear driven by the input shaft and is connected to drive the ring gear of the second gear set to provide a drive ratio higher than that in the second forward drive ratio. In the fourth forward drive ratio the ring gear of the third gear set is clutched to the input shaft to lock up the third and second gear sets and output to the output shaft is by the carrier of the second gear set to provide a direct drive between the input and output shafts. In the reverse drive ratio the ring gear of a fourth or reverse planetary gear set is retarded. The reverse gear set has a carrier connected to drive the output shaft having pinions meshing with the ring gear and a sun gear of the reverse gear set with the sun gear of the reverse gear set being driven by the ring gear of the second gear set to provide the reverse drive ratio.

An object of this invention is to provide an improved and simplified arrangement of planetary gear drives.

Another object of this invention is to provide an improved and simplified arrangement of planetary gear drives providing four drive ratios having a step between the first and second drive ratios smaller than the steps between the second and third drive ratios and the third and fourth drive ratios.

Another object of this invention is to provide in a transmission an improved and simplified range gearing arrangement including four planetary gear sets arranged to provide four forward and one reverse drive ratios.

Another object of this invention is to provide a planetary gearing arrangement including a first planetary gear set having a carrier operable to be retarded which has pinions meshing with a sun gear connected to drive an output shaft and a ring gear driven by the ring gear of a second planetary gear set, the second gear set including a carrier connected to drive the output shaft having pinions meshing with the ring gear of the second gear set which is operable to be retarded and a sun gear driven by an input shaft with the ring gear of the second gear set being driven by the carrier of a third planetary gear set having pinions meshing with a sun gear driven by the input shaft and a ring gear which may be selectively retarded and clutched to the input shaft and a fourth planetary gear set having a carrier connected to drive the output shaft having pinions meshing with a ring gear which is operable to be retarded and a sun gear driven by the ring gear of the second gear set.

These and other objects of the invention will be more apparent from the following description and drawing of a preferred embodiment of the invention.

The drawing shows diagrammatically a preferred embodiment of the invention.

The preferred embodiment illustrated in the drawing employs range gearing including a first planetary gear set 10, a second planetary gear set 11, a third planetary gear set 12 and a fourth or reverse planetary gear set 14 located in a stationary transmission housing 16 providing four forward and one reverse drive ratios.

As shown diagrammatically in the drawing an input member or shaft 18 which is adapted to be driven by a torque converter deriving power from a prime mover, such as an internal combustion engine, provides the input for the four speed and reverse transmission and drives the sun gear 19 of the second gear set and the sun gear 21 of the third gear set. The sun gear 19 meshes with a plurality of planetary pinions 22 mounted on the output carrier assembly 24 of the second gear set 11 and the carrier assembly 24 is connected to drive an output member or shaft 26 which is adapted to be connected to the load to be driven. The ring gear 28 of the second gear set 11 meshes with the planetary pinions 22 and is connected to the ring gear 32 of the first gear set 10 by means of a drum 33. The first gear set 10 has a carrier assembly 34 having a plurality of planetary pinions 36 meshing with the ring gear 32 and a sun gear 38 which is connected by means of an outer sleeve drive shaft 39 to the carrier assembly 40 of the fourth or reverse gear set 14. The carrier assembly 40 is connected to drive the output shaft 26 and the carrier assembly 34 of the first gear set 10 is connected to the rotating plate of a first forward drive brake 41 which when engaged holds the carrier assembly 34 stationary to provide the first forward drive ratio.

The ring gear 28 of the second gear set 11 is connected to the rotating plate of a second forward drive brake 43. The second forward drive brake 43 when engaged holds the ring gear 28 of the second gear set 11 stationary to provide the second forward drive ratio.

The carrier assembly 29 of the third gear set 12 has a plurality of planetary pinions 42 meshing with the sun gear 21 driven by the input shaft 18 and a ring gear 44 connected to the rotating plate of a third forward drive brake 46 which when engaged holds the ring gear 44 stationary to provide the third forward drive ratio.

The input shaft 18 drives the rotating plate of a direct drive clutch 48 mounted on the ring gear 44. The clutch 48 when engaged connects the ring gear 44 of the third gear set 12 to the input shaft 18 to provide the fourth forward drive ratio or direct drive.

The carrier assembly 29 is connected to the sun gear 52 of the reverse gear set 14 by means of drum 33, a drive connection 49 and an intermediate sleeve drive shaft 51 which is mounted external of output shaft 26 and internal of drive shaft 39. The carrier assembly 40 has a plurality of planetary pinions 54 meshing with the sun gear 52 and a ring gear 56 which is connected to the rotating plate of a reverse drive brake 58. When the brake 58 is engaged the ring gear 56 is held stationary and provides the reverse drive ratio.

Describing now the operation of the transmission, when the first forward drive brake 41 is engaged the carrier assembly 34 is locked to the transmission housing 16 and the sun gear 19 transmits torque to the drum 33 through the planetary pinions 22 which are caused to orbit in ring gear 28 in the same direction as input shaft 18 and at a reduced speed. With the carrier assembly 24 of the second gear set 11 connected to the output shaft 26 the torque thus introduced into the drum 33 rotates ring gear 32 of the first gear set 10 in a direction opposite that of input shaft 18 and since the carrier assembly 34 is held stationary planetary pinions 36 rotate and drive sun gear 38 in the same direction as input shaft 18. The sun gear 38 of the first gear set 10 by means of drive shaft 39 and carrier assembly 40, and the planetary pinions 22 of the second gear set 11 by means of carrier 24, simultaneously contribute torque to drive the output shaft 26 in the same direction as input shaft 18 and at a reduced speed to provide the first and lowest forward drive ratio.

When the second forward drive brake 43 is engaged to provide the second forward drive ratio, ring gear 28 is held stationary and the sun gear 19 causes planetary pinions 22 to orbit in the ring gear 28 in the same direction but at a lower speed thus carrying the carrier assembly 24 along with the planetary pinions to drive the output shaft 26. This provides a higher forward drive ratio than that provided in the first forward drive ratio.

When the third forward drive brake 46 is engaged to provide the third forward drive ratio, ring gear 44 of the third gear set 12 is held stationary and the rotation of the sun gear 21 causes planetary pinions 42 to orbit in the ring gear 44 and by means of carrier assembly 29 and drum 33, drive ring gear 28 of gear set 11 in the same direction as input shaft 18 but at a lower speed. Thus the ring gear 28 and the sun gear 19 of the second gear set are driven at reduced and input speeds respectively. The differential speed between sun gear 19 and the ring gear 28 of the second gear set causes the planetary pinions 22 to revolve about the sun gear 19 thus driving the output carrier assembly 24 and thus the ouput shaft 26. This combined drive provides a forward drive ratio to carrier assembly 24 and the connected output shaft 26 higher than the second forward drive ratio.

When the clutch 48 is engaged to provide the fourth forward drive ratio or direct drive, the sun gear 21 is locked to ring gear 44 of the third gear set so that the planetary pinions 42 do not rotate and thus the ring gear 28, sun gear 19 and planetary pinions 22 rotate together without relative rotation and drive carrier assembly 24 and output shaft 26 at the same speed as input shaft 18.

To obtain the reverse drive ratio the reverse drive brake 58 is engaged to hold ring gear 56 stationary and sun gear 19 transmits torque into the drum 33 through the planetary pinions 22. The torque thus introduced into the drum 33 by means of drive connection 49 and drive shaft 51 causes sun gear 52 to rotate in a direction opposite that of input shaft 18 and since the ring gear 56 is held stationary, the planetary pinions 54 orbit in the ring gear 56 in a direction opposite that of rotation of input shaft 18 to drive through carrier assembly 40 the output shaft 26 in the reverse direction.

Preferably the sun gears of the four gear sets are the same size, the planetary pinions of the four gear sets are the same size and the ring gears of the four gear sets are the same size.

When the sun gears each have 30 teeth and the ring gears each have 60 teeth, the drive ratios between the input and output shaft in the first forward drive ratio is 4.000:1, in the second forward drive ratio is 3.000:1, in the third forward drive ratio is 1.800:1, in the fourth forward drive ratio is 1.000:1 and in the reverse drive ratio is —5.200:1. The geometric step pattern is determined by dividing each succeeding higher drive ratio into the immediately preceding lower drive ratio and with the drive ratios provided above, the step between the first and second forward drive ratios is 1.333 and smallest, the step between the second and third forward drive ratios is 1.667 and the step between the third and fourth forward drive ratios is 1.800.

The above-described preferred embodiment is illustrative of the invention which it will be appreciated may be modified within the scope of the appended claims.

I claim:
1. In a transmission,
 (a) an input member and an output member,
 (b) a first planetary gear set comprising a sun gear, a ring gear and a carrier having a pinion meshing with both said sun gear and said ring gear,
 (c) a second planetary gear set comprising a sun gear, a ring gear and a carrier having a pinion meshing with both said sun gear and said ring gear,
 (d) said input member being connected to said sun gear of said second gear set, said carrier of said second gear set being connected to said output member and said ring gear of said second gear set being connected to said ring gear of said first gear set,
 (e) said sun gear of said first gear set being connected to said output member,
 (f) a drive establishing brake to selectively retard said carrier of said first gear set and cause said output member to rotate in the same direction as said input member and at a reduced speed,
 (g) and a drive establishing brake to selectively retard said ring gear of said second gear set and cause said output member to rotate in the same direction as said input member and at a reduced speed.
2. The invention defined in claim 1 and
 (h) said sun gears being the same size, said planetary pinions being the same size and said ring gears being the same size.

3. In a transmission,
(a) an input member and an output member,
(b) a first planetary gear set comprising a sun gear, a ring gear and a carrier having a pinion meshing with both said sun gear and said ring gear,
(c) a second planetary gear set comprising a sun gear, a ring gear and a carrier having a pinion meshing with both said sun gear and said ring gear,
(d) said input member being connected to said sun gear of said second gear set, said carrier of said second gear set being connected to said output member, and said ring gear of said second gear set being connected to said ring gear of said first gear set,
(e) said sun gear of said first gear set being connected to said output member,
(f) a first drive establishing brake to selectively retard said carrier of said first gear set to provide a first drive ratio between said members for driving said output member in the same direction as said input member,
(g) and a second drive establishing brake to selectively retard said ring gear of said second gear set to provide a second drive ratio higher than said first drive ratio between said members for driving said output member in the same direction as said input member.

4. The invention defined in claim 3 and
(h) a third planetary gear set comprising a sun gear, a ring gear and a carrier having a pinion meshing with both said sun gear and said ring gear,
(i) said input member being connected to said sun gear of said third gear set, said carrier of said third gear set being connected to said ring gear of said second gear set,
(j) and means to retard said ring gear of said third gear set to provide a third drive ratio higher than said second drive ratio.

5. The invention defined in claim 4 and
(k) said sun gears being the same size, said planetary pinions being the same size and said ring gears being the same size.

6. In a transmission,
(a) an input member and an output member,
(b) a first planetary gear set comprising a sun gear, a ring gear and a carrier having planetary pinions meshing with said sun gear and said ring gear,
(c) a second planetary gear set comprising a sun gear, a ring gear and a carrier having planetary pinions meshing with said sun gear and said ring gear,
(d) said input member being connected to said sun gear of said second gear set, said carrier of said second gear set being connected to said output member and said ring gear of said second gear set being connected to said ring gear of said first gear set,
(e) said sun gear of said first gear set being connected to said output member,
(f) means to selectively retard said carrier of said first gear set to provide a first drive ratio,
(g) means to selectively retard said ring gear of said second gear set to provide a second drive ratio,
(h) a third planetary gear set comprising a sun gear, a ring gear and a carrier having planetary pinions meshing with said sun gear and said ring gear,
(i) said input member being connected to said sun gear of said third gear set, said carrier of said third gear set being connected to said ring gear of said second gear set,
(j) means to retard said ring gear of said third gear set to provide a third drive ratio,
(k) and means to selectively connect said input member to said ring gear of said third gear set to provide a fourth drive ratio.

7. The invention defined in claim 6 and
(l) said sun gears being the same size, said planetary pinions being the same size and said ring gears being the same size.

8. In a transmission,
(a) an input member and an output member,
(b) a first planetary gear set comprising a sun gear, a ring gear and a carrier having planetary pinions meshing with said sun gear and said ring gear,
(c) a second planetary gear set comprising a sun gear, a ring gear and a carrier having planetary pinions meshing with said sun gear and said ring gear,
(d) said input member being connected to drive said sun gear of said second gear set, said carrier of said second gear set being connected to drive said output member, and said ring gear of said second gear set being connected to drive said ring gear of said first set,
(e) said sun gear of said first gear set being connected to drive said output member,
(f) means to selectively retard said carrier of said first gear set to provide a first forward drive ratio,
(g) means to selectively retard said ring gear of said second gear set to provide a second forward drive ratio,
(h) a third planetary gear set comprising a sun gear, a ring gear and a carrier having planetary pinions meshing with said sun gear and said ring gear,
(i) said input member being connected to drive said sun gear of said third gear set and said carrier of said third gear set being connected to drive said ring gear of said second gear set,
(j) means to selectively retard said ring gear of said third gear set to provide a third forward drive ratio,
(k) means to selectively connect said input member to said ring gear of said third gear set to provide a fourth forward drive ratio,
(l) a fourth planetary gear set comprising a sun gear, a ring gear and a carrier having planetary pinions meshing with said sun gear and said ring gear,
(m) said ring gear of said second gear set being connected to drive said sun gear of said fourth gear set and said carrier of said fourth gear set being connected to drive said output member,
(n) and means to selectively retard said ring gear of said fourth gear set to provide a reverse drive ratio.

9. The invention defined in claim 8 and
(o) said sun gears being the same size, said planetary pinions being the same size and said ring gears being the same size.

10. In a transmission,
(a) an input member and an output member,
(b) a first planetary gear set comprising a sun gear, a ring gear and a carrier having a pinion meshing with both said sun gear and said ring gear,
(c) a second planetary gear set comprising a sun gear, a ring gear and a carrier having a pinion meshing with both said sun gear and said ring gear,
(d) one of said members being connected to said sun gear of said second gear set, said carrier of said second gear set being connected to the other of said members, said ring gear of said second gear set being connected to said ring gear of said first gear set and said sun gear of said first gear set being connected to said other member,
(e) and means to selectively retard said carrier of said first gear set.

References Cited by the Examiner
UNITED STATES PATENTS

| | | | |
|---|---|---|---|
| 2,990,727 | 7/1961 | Miller | 74—759 |
| 3,020,781 | 2/1962 | Burtnett | 74—759 |
| 3,031,901 | 4/1962 | Simpson | 74—759 |
| 3,067,632 | 12/1962 | Foerster et al. | 74—759 |

DAVID J. WILLIAMOWSKY, *Primary Examiner.*

J. R. BENEFIEL, *Assistant Examiner.*